United States Patent
Maruko et al.

(10) Patent No.: US 7,113,390 B2
(45) Date of Patent: Sep. 26, 2006

(54) SURFACE-MOUNT THIN-PROFILE CAPACITOR AND METHOD OF PRODUCING THE SAME

(75) Inventors: Yuichi Maruko, Toyama (JP); Akihiro Kawai, Toyama (JP); Toshihisa Nagasawa, Toyama (JP); Tadamasa Asami, Toyama (JP)

(73) Assignees: NEC TOKIN Corporation, Sendai (JP); NEC TOKIN Toyama, Ltd., Toyama (JP)

( * ) Notice: Subject to any disclaimer, the term of this patent is extended or adjusted under 35 U.S.C. 154(b) by 0 days.

(21) Appl. No.: 11/037,509

(22) Filed: Jan. 18, 2005

(65) Prior Publication Data
US 2005/0162814 A1 Jul. 28, 2005

(30) Foreign Application Priority Data
Jan. 27, 2004 (JP) ............................. 2004-018489

(51) Int. Cl.
*H01G 9/00* (2006.01)

(52) U.S. Cl. .................... 361/523; 361/516; 361/525; 361/528; 361/529; 361/532; 29/25.03

(58) Field of Classification Search .. 361/306.1–306.3, 361/523–525, 528–532; 29/25.03
See application file for complete search history.

(56) References Cited

U.S. PATENT DOCUMENTS

| 4,203,194 | A | * | 5/1980 | McGrath | ................... 29/25.03 |
| 5,424,907 | A | * | 6/1995 | Kojima et al. | .............. 361/532 |
| 6,392,869 | B1 | * | 5/2002 | Shiraishi et al. | ............ 361/523 |
| 6,594,141 | B1 | * | 7/2003 | Takada | ....................... 361/523 |

* cited by examiner

*Primary Examiner*—Nguyen T. Ha
(74) *Attorney, Agent, or Firm*—Frishauf, Holtz, Goodman & Chick, P.C.

(57) ABSTRACT

In a surface-mount thin-profile capacitor including an aluminum foil as a base member composed of an aluminum core and a pair of etched layers covering opposite surfaces of the aluminum core, a resist resin is formed at a boundary between an anode as each of opposite end portions of the aluminum foil and a cathode formed at a center area of each of opposite surfaces of the aluminum foil. The resist resin separates and isolates the etched layer on the side of the anode and a conductive polymer layer from each other. If a part of the conductive polymer layer climbs up onto the resist resin, the climbing part of the conductive polymer layer is covered with an additional resist resin.

18 Claims, 6 Drawing Sheets

SURFACE-MOUNT THIN-PROFILE CAPACITOR AND METHOD OF PRODUCING THE SAME

This application claims priority to prior Japanese Patent Application JP 2004-18489, the disclosure of which is incorporated herein by reference.

BACKGROUND OF THE INVENTION

This invention relates to a surface-mount thin-profile capacitor and a method of producing the same and, in particular, to a surface-mount thin-profile capacitor including a metal foil as a base material and a method of producing the same.

A surface-mount thin-profile capacitor of the type includes a metal foil, such as an aluminum foil, as a base material. The metal foil comprises a metal core and a pair of etched layers covering opposite surfaces of the metal core. The metal foil is coated with an oxide film produced by "forming (electrochemical anodic oxidation in an electrochemical process)".

Figure 1:
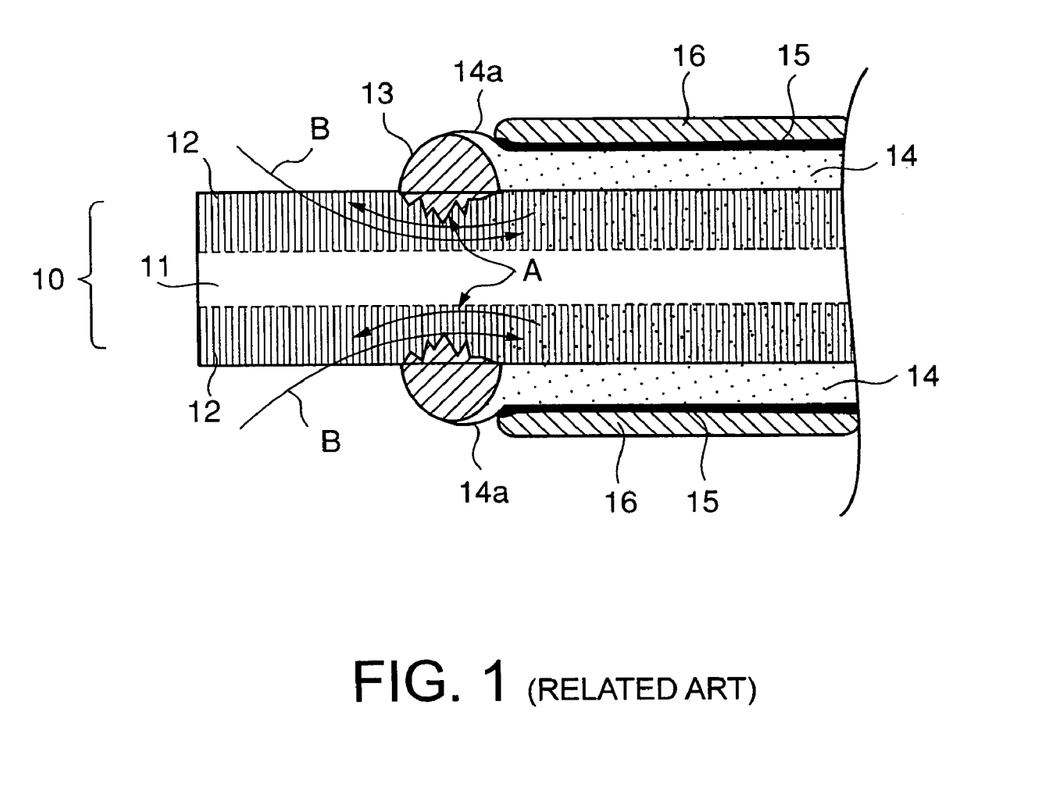
FIG. 1 is a sectional view of a part of an existing surface-mount thin-profile capacitor.

Referring to FIG. 1, an existing surface-mount thin-profile capacitor will be described. In the figure, only a left-hand side of the surface-mount thin-profile capacitor is shown. Although not shown in the figure, a right-hand side has a similar structure. In other words, the surface-mount thin-profile capacitor has a symmetrical structure. In the surface-mount thin-profile capacitor illustrated in the figure, a metal foil as a base material is an aluminum foil 10.

The aluminum foil 10 comprises an aluminum core 11 and a pair of etched layers 12 covering opposite surfaces of the aluminum core 11. The aluminum foil 10 has opposite end portions which serve as anodes, and opposite surfaces each of which has a center area provided with a cathode. The cathode comprises a graphite (Gr) layer 15 and a silver (Ag) layer 16.

The surface-mount thin-profile capacitor illustrated in the figure has a resist resin 13 formed at a boundary between each anode and the cathode (15, 16), and a conductive polymer layer 14 formed inside of and on a surface of each of the etched layers 12 at the center area of the aluminum foil 10. The conductive polymer layer 14 is formed by polymerization of a conductive polymer. On a surface of the conductive polymer layer 14, the cathode (15, 16) is formed.

Figure 2:
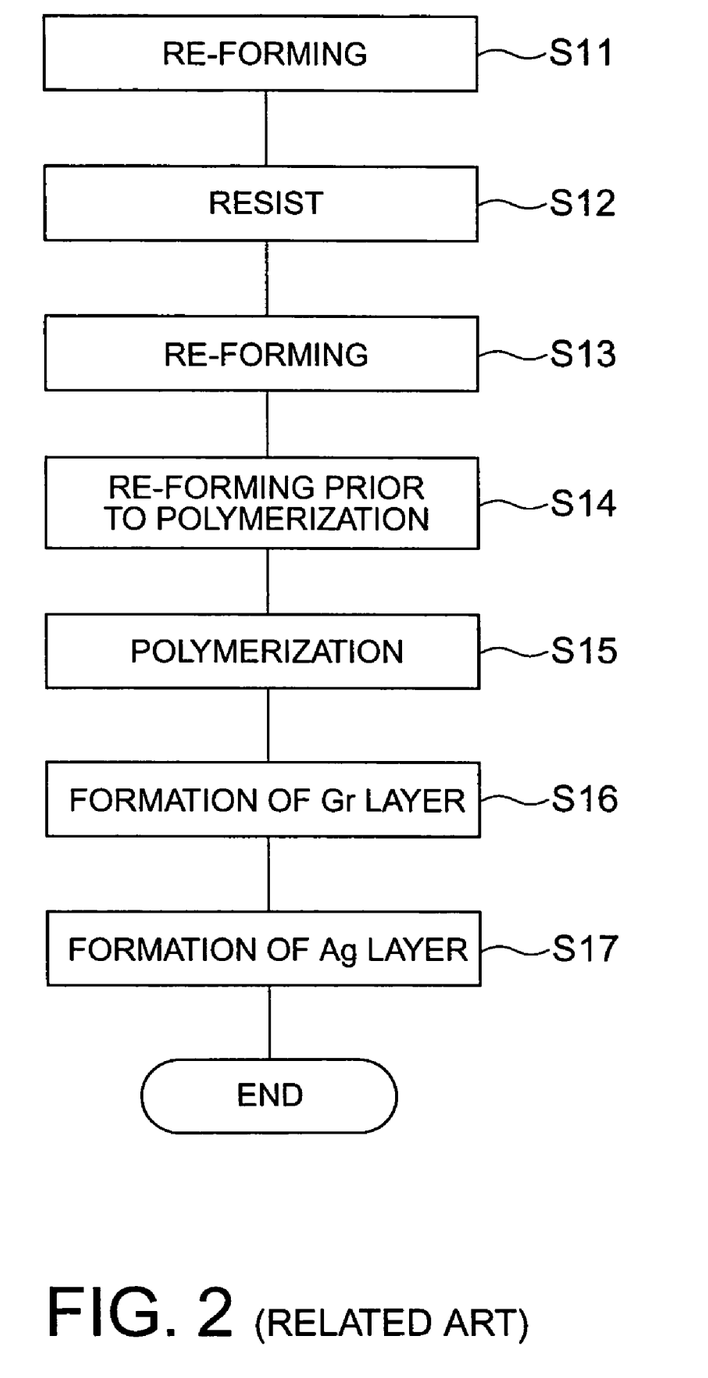
FIG. 2 is a flow chart for describing a method of producing the surface-mount thin-profile capacitor illustrated in FIG. 1.

Next referring to FIG. 2 in addition to FIG. 1, description will be made of a method of producing the existing surface-mount thin-profile capacitor.

At first, the aluminum foil 10 is prepared. The aluminum foil 10 has the aluminum core 11 and the etched layers 12 formed on the opposite surfaces of the aluminum core 11. The etched layers 12 have a number of very small pores. As well known in the art, the aluminum foil 10 is already subjected to forming. Herein, the term "forming" means production of a dielectric film (aluminum oxide film) (not shown) on each of the opposite surfaces of the aluminum foil 10 by electrochemical anodic oxidation. In detail, the dielectric film is also formed on an internal wall of each small pore in the etched layers 12.

Generally, the dielectric film covering each surface of the aluminum foil 10 is readily damaged. In order to repair a damaged portion of the dielectric film, the aluminum foil 10 is subjected to re-forming (aging) (step S11). The opposite end portions, i.e., left and right end portions (the left end portion alone is shown in the figure) of the aluminum foil 10 are used as the anodes of the capacitor. As will later be described, the cathode (15, 16) is formed at the center area of each of the opposite surfaces of the aluminum foil 10. At the boundary between each anode and the cathode (15, 16), the resist resin 13 is applied to the etched layer 12 of the aluminum foil 10 (step S12). Subsequently, the aluminum foil 10 is subjected to re-forming (step S13). Furthermore, re-forming is carried out prior to polymerization (step S14).

Thereafter, by polymerization of the conductive polymer, the conductive polymer layer 14 is formed at the center area of the aluminum foil 10 separated by the resist resin 13 from an anode-side area (step S15). In this process, a part of the conductive polymer penetrates into the etched layer 12 of the aluminum foil 10. In other words, the conductive polymer enters into the small pores of the etched layer 12. By repeating polymerization, the conductive polymer layer 14 is formed to a height substantially equal to that of the resist resin 13. As shown in FIG. 1, a part 14a of the conductive polymer layer 14 at each of left and right ends thereof (only the left end is illustrated in the figure) may sometimes climb up onto an upper surface of the resist resin 13 to be exposed.

On the surface of the conductive polymer layer 14, the Gr layer 15 is formed (step S16). Then, on a surface of the Gr layer 15, the Ag layer 16 is formed (step S17). A combination of the Gr layer 15 and the Ag layer 16 is used as the cathode of the capacitor. Thus, the existing surface-mount thin-profile capacitor is produced.

In the surface-mount thin-profile capacitor of the above-mentioned structure, a porous portion of the etched layer 12 can not completely be filled by the resist resin 13. Therefore, as depicted by arrows A and B in FIG. 1, the conductive polymer and oxygen easily pass through the porous portion of the etched layer 12 inside the resist resin 13. As a result, the existing surface-mount thin-profile capacitor has following disadvantages.

(1) Entry of oxygen promotes oxidation deterioration of the conductive polymer. Therefore, high-temperature reliability can not be assured.

(2) Penetration of the conductive polymer towards the anode causes short-circuiting and an increase in LC.

(3) Exposure of the part 14a of the conductive polymer layer 14 climbing up onto the upper surface of the resist resin 13 causes oxidation deterioration of the polymer.

Presumably, the above-mentioned disadvantages are caused by the following reason. The porous portion of the etched layer 12 of the aluminum foil 10 has very small pores. Therefore, the resist resin 13 can not completely be filled from the surface of the aluminum foil 10 to the depth of the etched layer 12.

SUMMARY OF THE INVENTION

It is an object of this invention to provide a surface-mount thin-profile capacitor which can be reduced in oxidation deterioration of a conductive polymer due to entry of oxygen and a method of producing the same.

It is another object of this invention to provide a surface-mount thin-profile capacitor which can be prevented from occurrence of short-circuiting due to penetration of a conductive polymer towards an anode and an increase in LC and a method of producing the same.

It is still another object of this invention to provide a surface-mount thin-profile capacitor which is prevented from oxidation deterioration of a conductive polymer due to exposure of a part thereof and a method of producing the same.

According to a first aspect of this invention, there is provided a surface-mount thin-profile capacitor including a metal foil as a base material comprising a metal core and a pair of etched layers covering opposite surfaces of the metal core, the metal foil having opposite end portions used as anodes and opposite surfaces each of which has a center area provided with a cathode, a resist resin formed at a boundary between each anode and the cathode, and a conductive polymer layer formed by polymerization of a conductive polymer inside of and on a surface of each of the etched layers at the center area of the metal foil, the cathode being formed on a surface of the conductive polymer layer, wherein the resist resin is formed so as to separate and isolate the etched layer on the side of the anode and the conductive polymer layer from each other.

In the surface-mount thin-profile capacitor mentioned above, the metal foil may be an aluminum foil. In case where a part of the conductive polymer layer climbs up onto the resist resin, the surface-mount thin-profile capacitor preferably has an additional resist resin covering the climbing part of the conductive polymer layer. The resist resin is preferably selected from a group including an epoxy resin and an acrylic resin. The additional resist resin is desirably selected from a group including an epoxy resin and an acrylic resin.

According to a second aspect of this invention, there is provided a method of producing a surface-mount thin-profile capacitor including a metal foil as a base material comprising a metal core and a pair of etched layers covering opposite surfaces of the metal core, the method comprising the steps of removing a part of the etched layer at a boundary between each of anodes as opposite end portions of the metal foil and a cathode to be formed at a center area of each of opposite surfaces of the metal foil to leave a space as a removed portion, filling a resist resin in the removed portion, forming a conductive polymer layer by polymerization of a conductive polymer inside of and on a surface of each of the etched layers at the center area of the metal foil, and forming the cathode on a surface of the conductive polymer layer.

In case where a part of the conductive polymer layer climbs up onto the resist resin, the method according to the second aspect preferably includes the step of forming an additional resist resin covering the climbing part of the conductive polymer layer. The width of the removed portion is preferably 1 mm or less. The resist resin is preferably selected from a group including an epoxy resin and an acrylic resin. The additional resist resin is desirably selected from a group including an epoxy resin and an acrylic resin.

According to a third aspect of this invention, there is provided a method of producing a surface-mount thin-profile capacitor including a metal foil as a base material comprising a metal core and a pair of etched layers covering opposite surfaces of the metal core, the method comprising the steps of compressing a part of the etched layer at a boundary between each of anodes as opposite end portions of the metal foil and a cathode to be formed at a center area of each of opposite surfaces of the metal foil to obtain a space as a compressed portion, filling a resist resin in the compressed portion, forming a conductive polymer layer by polymerization of a conductive polymer inside of and on a surface of each of the etched layers at the center area of the metal foil, and forming the cathode on a surface of the conductive polymer layer.

In case where a part of the conductive polymer layer climbs up onto the resist resin, the method according to the third aspect preferably includes the step of forming an additional resist resin covering the climbing part of the conductive polymer layer. The width of the compressed portion is preferably 1 mm or less. The resist resin is preferably selected from a group including an epoxy resin and an acrylic resin. The additional resist resin is desirably selected from a group including an epoxy resin and an acrylic resin.

DESCRIPTION OF THE PREFERRED EMBODIMENT

Now, an embodiment of this invention will be described with reference to the drawing.

Figure 3A:
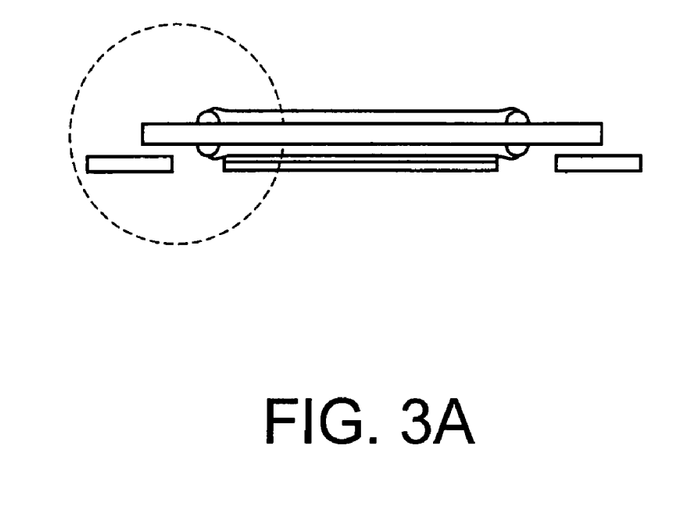
FIG. 3A is a schematic front view of a surface-mount thin-profile capacitor according to a first embodiment of this invention.
Figure 3B:
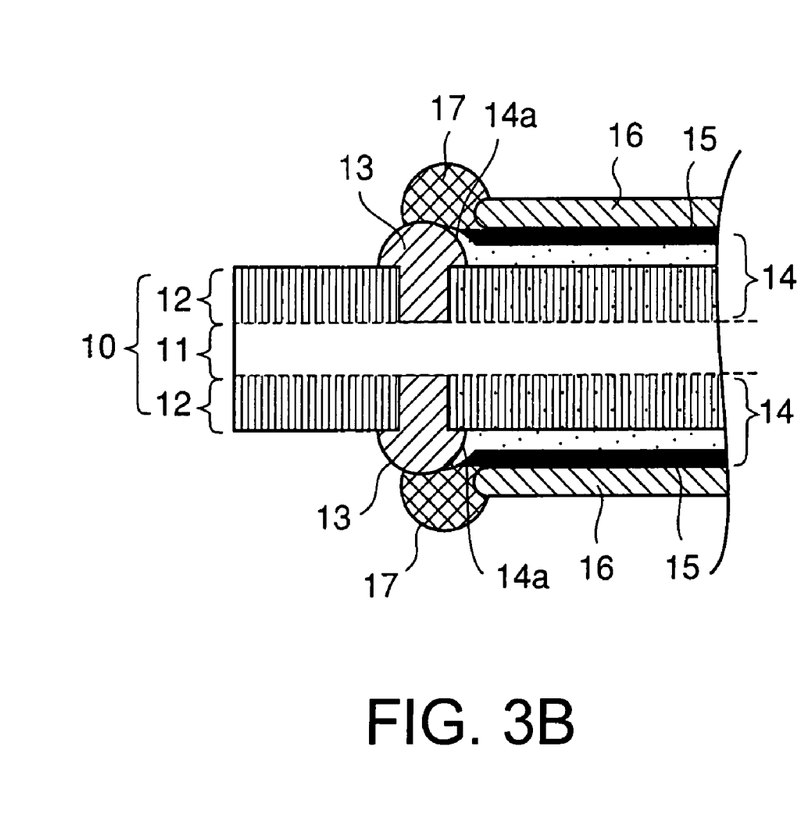
FIG. 3B is a sectional view of an encircled part in FIG. 3A.

Referring to FIGS. 3A and 3B, a surface-mount thin-profile capacitor according to one embodiment of this invention will be described. As seen from FIG. 3A, the surface-mount thin-profile capacitor has a symmetrical structure.

The surface-mount thin-profile capacitor illustrated in the figures includes, as a base material, an aluminum foil 10 comprising an aluminum core 11 and a pair of etched layers 12 covering opposite surfaces of the aluminum core 11. The aluminum foil 10 has opposite end portions which serve as anodes, and opposite surfaces each of which has a center area provided with a cathode. The cathode comprises a graphite (Gr) layer 15 and a silver (Ag) layer 16.

The surface-mount thin-profile capacitor has a resist resin 13 formed at a boundary between each anode and the cathode (15, 16), and a conductive polymer layer 14 which is formed inside of and on a surface of each of the etched layers 12 at the center area of the aluminum foil 10. The conductive polymer layer 14 is formed by polymerization of a conductive polymer. On a surface of the conductive polymer layer 14, the cathode (15, 16) is formed.

In this embodiment, the resist resin 13 is formed so as to separate and isolate the etched layer 12 on the side of the anode and the conductive polymer layer 14 from each other. A part 14a of the conductive polymer layer 14 climbs up onto the resist resin 13. The surface-mount thin-profile capacitor further has an additional resist resin 17 covering the climbing part 14a of the conductive polymer layer 14.

The resist resin 13 is selected from a group including an epoxy resin and an acrylic resin. The additional resist resin 17 is also selected from a group including an epoxy resin and an acrylic resin. This is because the epoxy resin or the acrylic resin is a high-density resin.

Figure 4:
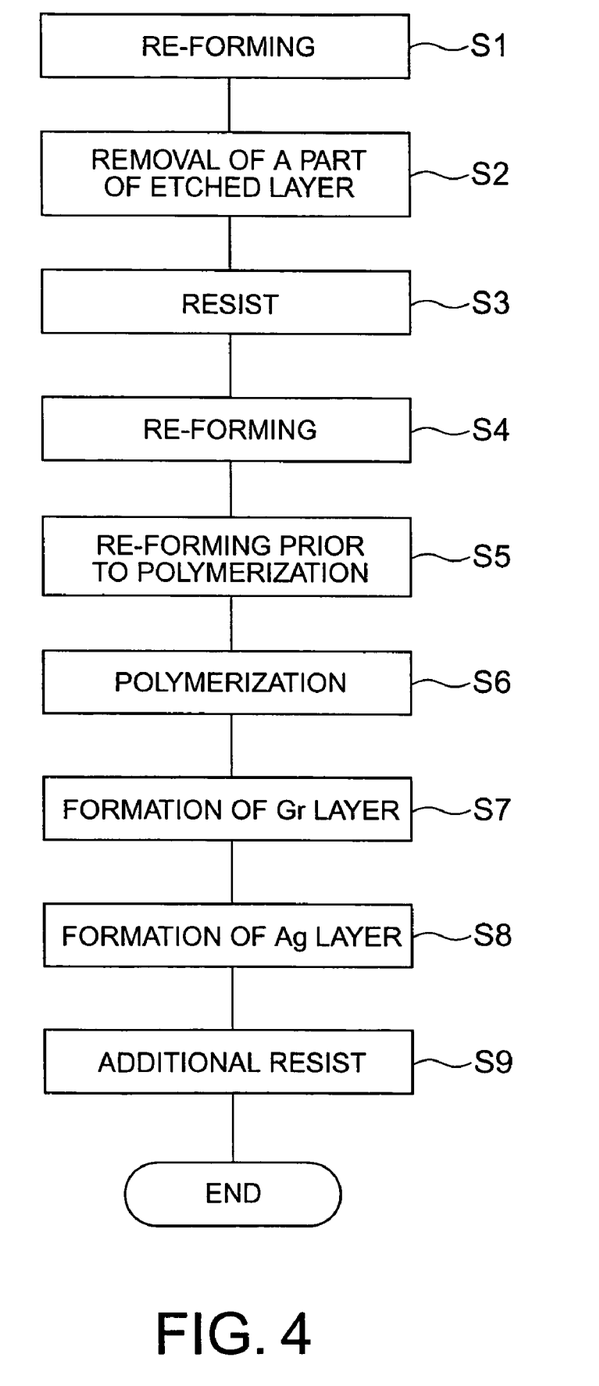
FIG. 4 is a flow chart for describing a first method of producing the surface-mount thin-profile capacitor illustrated in FIG. 3A.

Next referring to FIG. 4 in addition to FIGS. 3A and 3B, a first method of producing the surface-mount thin-profile capacitor according to this embodiment will be described.

At first, the aluminum foil 10 is prepared. The aluminum foil 10 has the aluminum core 11 and the etched layers 12 formed on the opposite surfaces of the aluminum core 11. The etched layers 12 have a number of very small pores. As described above, the aluminum foil 10 is preliminarily subjected to forming. As a consequence, the surface of the aluminum foil 10 is coated with an aluminum oxide film (not shown). In detail, the aluminum oxide film is also formed on an internal wall of each small pore in the etched layers 12. The aluminum oxide film serves as a dielectric film of the capacitor.

Generally, the dielectric film covering each surface of the aluminum foil 10 is readily damaged. In order to repair a damaged portion of the dielectric film, the aluminum foil 10 is subjected to re-forming (step S1). The opposite end portions, i.e., left and right end portions (the left end portion alone is shown in FIG. 3B) of the aluminum foil 10 are used as the anodes of the capacitor. As will later be described, the cathode (15, 16) is formed at the center area of each of the opposite surfaces of the aluminum foil 10.

Next, the etched layer 12 at a boundary between each anode and the cathode, i.e., in an area where the resist resin 13 is to be formed is removed (step S2). Herein, the width of a removed portion is 1 mm or less. The resist resin 13 is filled in the removed portion and formed to a desired height (step S3). Subsequently, the aluminum foil 10 is subjected to re-forming (step S4). Furthermore, re-forming is carried out prior to polymerization (step S5).

Next, by polymerization of the conductive polymer, the conductive polymer layer 14 is formed at the center area of the aluminum foil 10 separated by the resist resin 13 from an anode-side area (step S6). In this process, a part of the conductive polymer penetrates into the etched layer 12 of the aluminum foil 10. By repeating polymerization, the conductive polymer layer 14 is formed to a height substantially equal to that of the resist resin 13. As shown in FIG. 3B, a part 14a of the conductive polymer layer 14 at each of left and right ends thereof (only the left end is illustrated in the figure) climbs up onto an upper surface of the resist resin 13 to be exposed.

Thereafter, on the surface of the conductive polymer layer 14, the Gr layer 15 is formed (step S7). Then, on a surface of the Gr layer 15, the Ag layer 16 is formed (step S8). A combination of the Gr layer 15 and the Ag layer 16 is used as the cathode of the capacitor.

Further, in this embodiment, after the Ag layer 16 is formed, the additional resist resin 17 is applied in an area from the upper surface of the resist resin 13 to an end portion of the Ag layer 16 to cover the climbing part 14a of the conductive polymer layer 14 climbing onto the resist resin 13 (step S9).

In the above-mentioned manner, the surface-mount thin-profile capacitor according to this embodiment is produced.

As described above, in the first method, a part of the etched layer 12 of the aluminum foil 10 is removed before the resist resin 13 is applied. The resist resin 13 is filled in the removed portion and formed to a desired height. Thus, the etched layer 12 is separated by the resist resin 13 into an anode-side portion and a cathode-side portion. Therefore, it is possible to prevent oxygen from entering from the anode-side portion of the etched layer 12 into the conductive polymer layer 14 through the etched layer 12. As a consequence, it is possible to suppress oxidation deterioration of the conductive polymer layer 14. Conversely, it is possible to prevent the conductive polymer from entering (penetrating) from the conductive polymer layer 14 towards the anode-side portion of the etched layer 12. As a consequence, it is possible to prevent occurrence of short-circuiting of the surface-mount thin-profile capacitor and an increase in LC.

In the first method, the climbing part 14a of the conductive polymer layer 14 climbing onto the upper surface of the resist resin 13 is covered with the additional resist resin 17. Therefore, it is possible to completely isolate the conductive polymer layer 14 from oxygen. As a consequence, it is possible to prevent oxidation deterioration of the conductive polymer layer 14.

Figure 5:
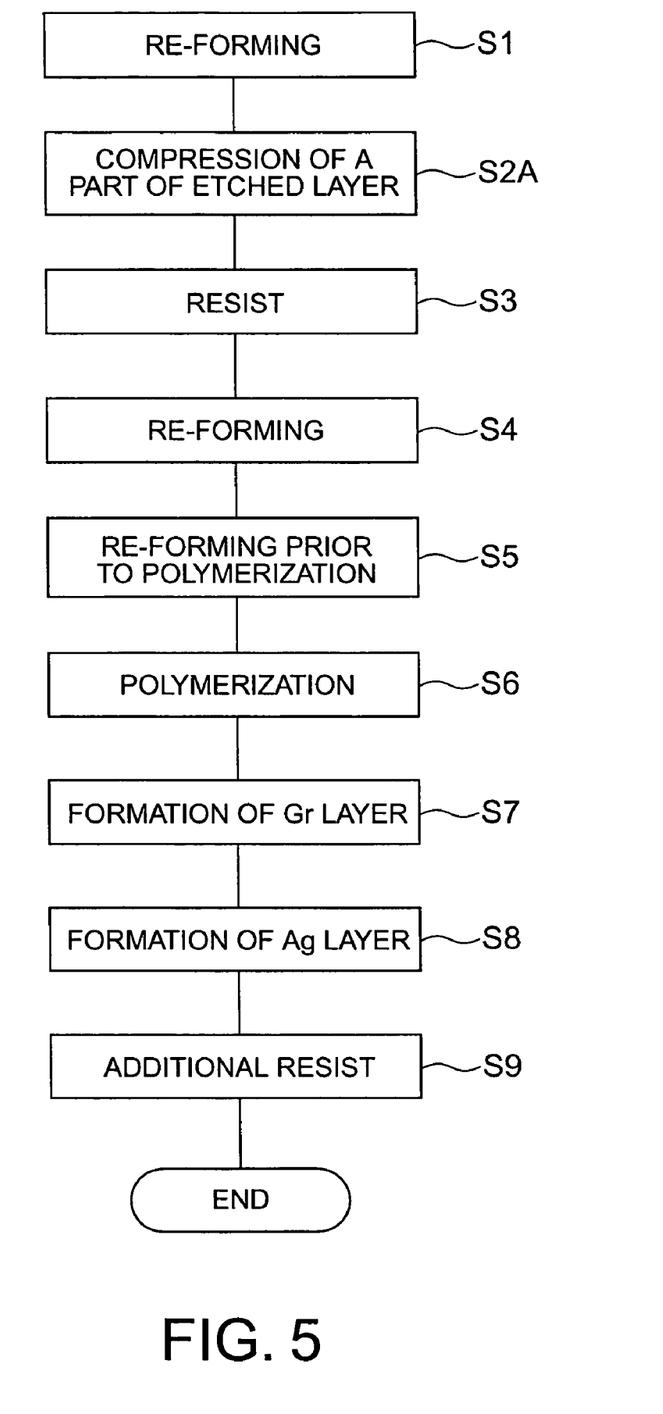
FIG. 5 is a flow chart for describing a second method of producing the surface-mount thin-profile capacitor illustrated in FIG. 3A.

Next referring to FIG. 5 in addition to FIGS. 3A and 3B, a second method of producing the surface-mount thin-profile capacitor according to the embodiment will be described.

The second method is different from the first method in that the above-mentioned step S2 of removing a part of the etched layer 12 in an area where the resist resin 13 is to be formed, i.e., at the boundary between the anode and the cathode (15, 16) is replaced by a step S2A of compressing the etched layer 12. The remaining steps except the step S2A are similar to those of the first method. Therefore, detailed description of the second method is omitted and different points alone will be described.

Herein, the term "compressing" means reducing the thickness of the etched layer 12 to be substantially equal to zero (in other words, collapsing the etched layer 12) so that a number of small pores formed in the etched layer 12 are eliminated.

The width of a compressed portion obtained by the compressing step S2A is 1 mm or less. The resist resin is filled in the compressed portion and formed to a desired height (step S3). Subsequent steps are similar to those in the first method described above.

As described above, in the second method, a part of the etched layer 12 of the aluminum foil 10 is compressed before the resist resin 13 is applied. The resist resin 13 is filled in the compressed portion and formed to a desired height. Thus, the etched layer 12 is separated by the resist resin 13 into the anode-side portion and the cathode-side portion. Therefore, it is possible to prevent oxygen from entering from the anode-side portion of the etched layer 12 into the conductive polymer layer 14 through the etched layer 12. As a consequence, it is possible to suppress oxidation deterioration of the conductive polymer layer 14. Conversely, it is possible to prevent the conductive polymer from entering (penetrating) from the conductive polymer layer 14 towards the anode-side portion of the etched layer 12. As a consequence, it is possible to prevent occurrence of short-circuiting of the surface-mount thin-profile capacitor and an increase in LC.

In the second method also, the climbing part 14a of the conductive polymer layer 14 climbing onto the upper surface of the resist resin 13 is covered with the additional resist resin 17. Therefore, it is possible to completely isolate the conductive polymer layer 14 from oxygen. As a consequence, it is possible to prevent oxidation deterioration of the conductive polymer layer 14.

Figure 6:
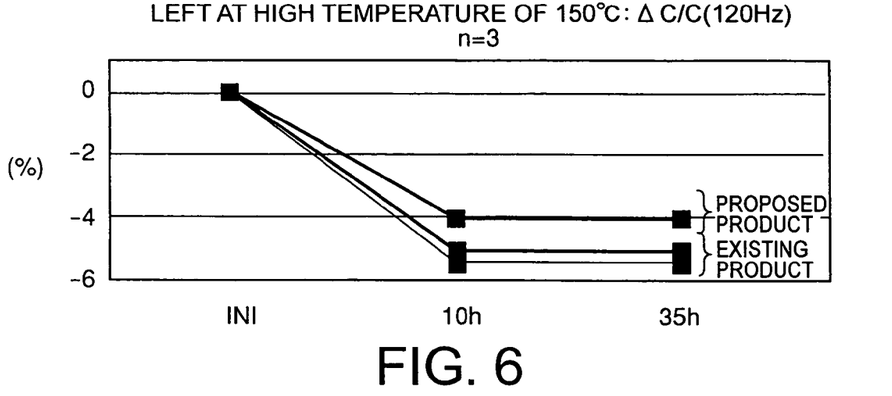
FIG. 6 is a view showing a capacitance variation ($\Delta C/C$) characteristic of each of a proposed product (the surface-mount thin-profile capacitor according to this invention) and an existing product (the existing surface-mount thin-profile capacitor) when a voltage having a frequency of 120 Hz was applied.
Figure 7:
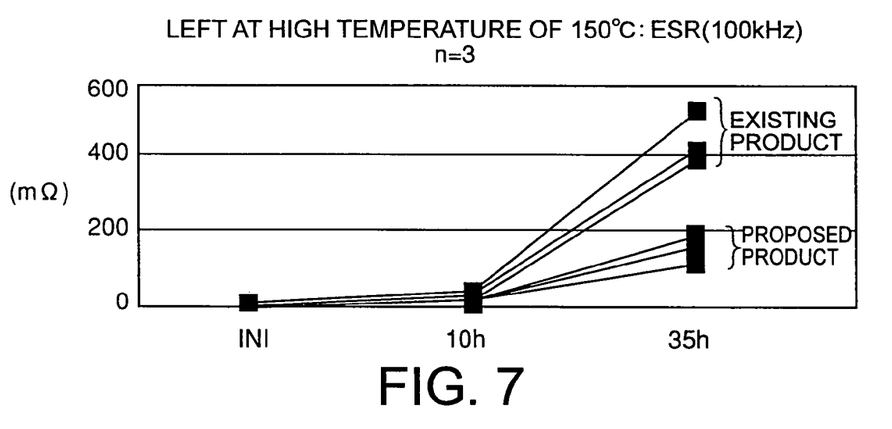
FIG. 7 is a view showing an equivalent series resistance (ESR) characteristic of each of the proposed product and the existing product when a voltage having a frequency of 100 Hz was applied.
Figure 8:
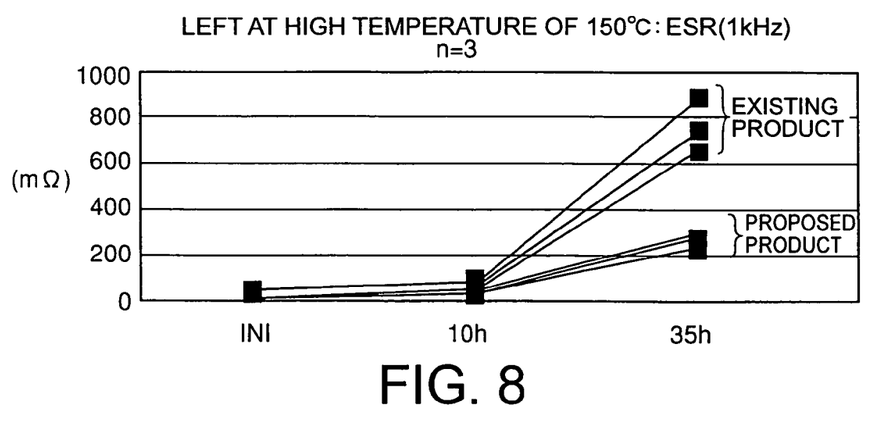
FIG. 8 is a view showing an equivalent series resistance (ESR) characteristic of each of the proposed product and the existing product when a voltage-having a frequency of 1 kHz was applied.

Referring to FIGS. 6 through 8, various characteristics of the surface-mount thin-profile capacitor according to this invention (hereinafter will simply be called a "proposed product", FIG. 3) and the existing surface-mount thin-profile capacitor (hereinafter will simply be called an "existing product", FIG. 1) when these products were left at a high temperature (150° C.). Herein, three samples were used for each of the proposed product and the existing product (n=3).

FIG. 6 shows a capacitance variation (ΔC/C) characteristic as measured in the state where a voltage having a frequency of 120 Hz was applied to each sample. In the figure, an abscissa represents a time (h) and an ordinate represents a capacitance variation ratio (%). As seen from FIG. 6, the proposed product has a capacitance variation ratio (ΔC/C) smaller than that of the existing product.

FIG. 7 shows an equivalent series resistance (ESR) characteristic as measured in the state where a voltage having a frequency of 100 Hz was applied to each sample. In the figure, an abscissa represents a time (h) and an ordinate represents a resistance value (mΩ). As seen from FIG. 7, the proposed product has a smaller ESR than that of the existing product even after lapse of time.

FIG. 8 shows an equivalent series resistance (ESR) characteristic as measured in the state where a voltage having a frequency of 1 kHz was applied to each sample. In the figure, an abscissa represents a time (h) and an ordinate represents a resistance value (mΩ). As seen from FIG. 8, the proposed product has a smaller ESR than that of the existing product even after lapse of time.

From the above, the proposed product is excellent in characteristics as compared with the existing product.

According to this invention, it is possible to suppress oxidation deterioration of the conductive polymer by inhibiting entry of oxygen from the anode-side area into the conductive polymer layer through the etched layer.

According to this invention, it is possible to avoid occurrence of short-circuiting of the capacitor and an increase in LC by inhibiting entry (permeation) of the conductive polymer from the conductive polymer layer towards the anode-side area through the etched layer.

According to this invention, it is possible to prevent oxidation deterioration of the conductive polymer layer by forming the additional resist resin on the climbing part of the conductive polymer layer climbing up onto the resist resin so as to completely isolate the conductive polymer layer from oxygen.

While this invention has thus far been described in connection with the preferred embodiment thereof, it will be readily possible for those skilled in the art to put this invention into practice in various other manners without departing from the scope set forth in the appended claims. For example, in the foregoing embodiment, the climbing part 14a of the conductive polymer resin 14 climbing up onto the resist resin 13 is covered with the additional resist resin 17. However, the additional resist resin 17 may be omitted. In the foregoing embodiment, the aluminum foil was used as the metal foil as a base member. Alternatively, any other appropriate metal foil may be used as the base material.

What is claimed is:

1. A surface-mount thin-profile capacitor comprising:
   a metal foil as a base material, said metal foil including a metal core and a pair of etched layers covering opposite surfaces of the metal core, and said metal foil having opposite end portions that form anodes and opposite surfaces each having a center area provided with a cathode;
   a resist resin formed at a boundary between each anode and the cathode; and
   a conductive polymer layer formed by polymerization of a conductive polymer inside of and on a surface of each of the etched layers at the center area of the metal foil, the cathode being formed on a surface of the conductive polymer layers;
   wherein a part of the etched layers at each said boundary between each anode and the cathode is removed to form a removed portion; and
   wherein the resist resin is formed in each said removed portion so as to separate and isolate the conductive polymer layer from portions of the etched layers at the end portions of the metal foil that form the anodes.

2. The surface-mount thin-profile capacitor according to claim 1, wherein the metal foil comprises an aluminum foil.

3. The surface-mount thin-profile capacitor according to claim 1, wherein a part of the conductive polymer layer climbs up onto the resist resin, and the climbing part of the conductive polymer layer is covered with an additional resist resin.

4. The surface-mount thin-profile capacitor according to claim 1, wherein the resist resin is selected from a group including an epoxy resin and an acrylic resin.

5. The surface-mount thin-profile capacitor according to claim 3, wherein the additional resist resin is selected from a group including an epoxy resin and an acrylic resin.

6. A method of producing a surface-mount thin-profile capacitor including a metal foil as a base material, wherein said metal foil includes a metal core and a pair of etched layers covering opposite surfaces of the metal core, the method comprising:
   removing a part of the etched layers at a boundary between each of anodes at opposite end portions of the metal foil and a cathode to be formed at a center area of each of opposite surfaces of the metal foil to leave a space as a removed portion;
   filling a resist resin in the removed portion;
   forming a conductive polymer layer by polymerization of a conductive polymer inside of and on a surface of each of the etched layers at the center area of the metal foil; and
   forming the cathode on a surface of the conductive polymer layer.

7. The method according to claim 6, further comprising forming an additional resist resin so as to cover a climbing part of the conductive polymer layer that climbs up onto the resist resin.

8. The method according to claim 6, wherein a width of the removed portion is not more than 1 mm.

9. The method according to claim 6, wherein the resist resin is selected from a group including an epoxy resin and an acrylic resin.

10. The method according to claim 7, wherein the additional resist resin is selected from a group including an epoxy resin and an acrylic resin.

11. The method according to claim 7, wherein a width of the removed portion is not more than 1 mm.

12. A method of producing a surface-mount thin-profile capacitor including a metal foil as a base material, wherein said metal foil includes a metal core and a pair of etched layers covering opposite surfaces of the metal core, the method comprising:
   compressing a part of the etched layers at a boundary between each of anodes at opposite end portions of the metal foil and a cathode to be formed at a center area of each of opposite surfaces of the metal foil to obtain a space as a compressed portion;

filling a resist resin in the compressed portion;

forming a conductive polymer layer by polymerization of a conductive polymer inside of and on a surface of each of the etched layers at the center area of the metal foil; and forming the cathode on a surface of the conductive polymer layer.

13. The method according to claim 12, further comprising forming an additional resist resin so as to cover a climbing part of the conductive polymer layer that climbs up onto the resist resin.

14. The method according to claim 12, wherein a width of the compressed portion is not more than 1 mm.

15. The method according to claim 12, wherein the resist resin is selected from a group including an epoxy resin and an acrylic resin.

16. The method according to claim 13, wherein the additional resist resin is selected from a group including an epoxy resin and an acrylic resin.

17. The method according to claim 13, wherein a width of the compressed portion is not more than 1 mm.

18. A surface-mount thin-profile capacitor comprising:

a metal foil as a base material, said metal foil including a metal core and a pair of etched layers covering opposite surfaces of the metal core, and said metal foil having opposite end portions that form anodes and opposite surfaces each having a center area provided with a cathode;

a resist resin formed at a boundary between each anode and the cathode; and a conductive polymer layer formed by polymerization of a conductive polymer inside of and on a surface of each of the etched layers at the center area of the metal foil, the cathode being formed on a surface of the conductive polymer layer;

wherein a part of the etched layers at each said boundary between each anode and the cathode is removed by compression to leave a space as a compressed portion; and wherein the resist resin is formed in each said compressed portion so as to separate and isolate the conductive polymer layer from portions of the etched layers at the end portions of the metal foil that form the anodes.

* * * * *